UNITED STATES PATENT OFFICE.

ISAAC KING PHELPS, OF NEW HAVEN, CONNECTICUT.

PROCESS FOR OBTAINING OLEFIN OR SATURATED ACIDS.

974,182.  Specification of Letters Patent.  Patented Nov. 1, 1910.

No Drawing.  Application filed June 1, 1908.  Serial No. 436,179.

*To all whom it may concern:*

Be it known that I, ISAAC K. PHELPS, of the city and county of New Haven and State of Connecticut, have invented new and useful Improvements in the Process for Obtaining Olefin or Saturated Acids or Their Derivatives, of which the following is a full, clear, and exact description.

The present invention relates to the process for obtaining olefin acids or saturated acids or their derivatives by reducing the oxidized form of any one of these. The processes for reducing the oxidized forms of these acids hitherto employed have been commercially objectionable because of the expense. There have been two methods in use for commercially manufacturing such an acid, for example, as succinic acid, commonly called "salt of amber." One has been by means of the distillation of amber by which the succinic acid is found in the distillate, but the quantity has not usually amounted to more than four per cent. of the amber used. Another method of obtaining succinic acid has been by the fermentation of ammonium tartrate, but this method has been of little use, chiefly because such a large part of the tartaric acid is used up in the fermentation to produce other substances than succinic acid. The amount of succinic acid produced is, therefore, so low in proportion to the tartaric acid used that the process is even less efficient commercially than the one above referred to, namely, the distillation of amber, which is in itself expensive. This second method is essentially one of reduction, bacteria being the efficient reducing means.

Hydriodic acid in water solution has been used in chemistry as such a reducing agent, usually in the presence of some substance like phosphorus to take up the iodin produced by the reducing action of the hydriodic acid. The phosporus combines with iodin and this combination reacts with water and produces hydriodic acid and an acid of phosphorus; hence very commonly instead of starting with a water solution of hydriodic acid a mixture of phosphorus, iodin and water has found practical use as a reducing agent. In whatever form this reducer is used a water solution has been employed. For example, the mixture of phosphorus, iodin and water has been used to produce malic acid from tartaric acid by heating for a long time in a pressure tube. The difficulty with this process commercially has been that it was slow; that the tartaric acid was decomposed to form other substances, consequently resulting in a poor yield; and that the temperature necessary for the reaction has been so high that heating under pressure was required, which is an almost insurmountable difficulty in practical use. By using the malic acid thus obtained and subjecting it to further treatment with phosphorus and iodin in water solution as reducing agents succinic acid has been produced, but this has never been a commercial method for making succinic acid because of the expense of the malic acid, as suggested above, and the recurrence of the same difficulties in this operation.

Fumaric acid may be obtained by heating malic acid derived as above, but the yield would be poor. Consequently, while malic acid has been obtained from tartaric acid, the commercial supply has been derived from natural sources, such as the mountain ash berries, or unripe apples or grapes in which it occurs.

The present invention consists in dissolving an oxidized form of an olefin or saturated acid; for example, tartaric acid in a carbon-compound solvent, such as glacial acetic acid, and reducing it by a mixture of phosphorus and iodin. By use of an organic solvent rather than water the formation of other substances is obviated, and in this solution the temperature necessary to produce the reduction is low enough so that heating under pressure is unnecessary, the reduction taking place to some extent even at ordinary room temperature. The carbon-compound solvent, glacial acetic acid in this case contains sufficient water to generate the hydriodic acid as explained above. If a catalytic agent, such as zinc chlorid is added the time required for the reduction is materially shortened and the yield of pure product greatly increased.

The difficulties in the old hydriodic acid process, which caused such poor yields of the desired products, were presumably twofold; one, the high temperature necessary for the action, and the other, the long period of heating, for as the desired action was slow, by-products were formed in large quantity. The use of the organic solvent meets the former difficulty and use of the catalytic agent, the other. It is also possible that in this process the catalytic agent has a function different from that usual with such agents, namely, that of accelerating chemical action, for in the present process it may have the function of producing such conditions that the by-products of the old hydriodic acid process cannot be formed in its presence. It is certain, at least, that when both the organic solvent and the catalytic agent are used the desired products are produced in nearly ideal quantities.

To more fully describe the process, its application to tartaric acid may be taken as an illustration. Sixty grms. of tartaric acid and 2 grms. of zinc chlorid may be dissolved with about 15 grms. of iodin in approximately 100 c. c. of glacial acetic acid. To this some 14 grms. of red phosphorus may be added and the mixture heated for about two hours upon a return condenser. Upon turning the condenser and distilling off the acetic acid and iodin, the succinic acid will remain in the flask. This may be purified by bone black and crystallization from water.

The chemical equations representing the actions are presumably (1) 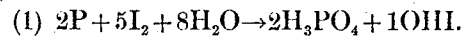

and (2) 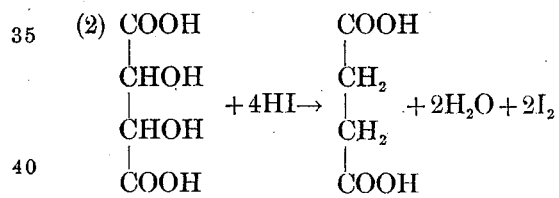

To produce fumaric acid the same procedure can be followed, except that a smaller quantity of red phosphorus, as, for example, 6.5 grms. can be used in place of 14 grms.

The chemical equations representing the process are presumably (1) 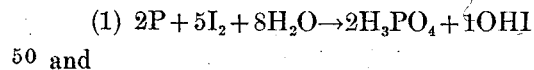

and (2) 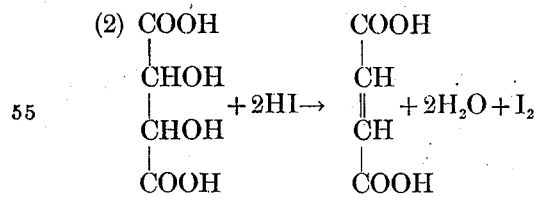

As examples of other anhydrous or substantially anhydrous organic solvents which are applicable in place of the commercial glacial acetic acid mentioned in the example stated, anhydrous acetic acid, proprionic acid, butyric acid, etc., may be mentioned; similarly in place of the catalytic agent zinc chlorid, the following among others are applicable, copper salts, iron salts, and metallic zinc.

Whether the reduction of the acid goes to an olefin acid or to an acid of the saturated series depends only upon the amount of phosphorus used. If a derivative of an oxidized form of an olefin or saturated acid is reduced, such as an ester, for example, a derivative (in this case, the ester) of the olefin acid or the acid of the saturated series is obtained. Hence it follows that the invention is not limited to the process of reduction of the acids themselves as stated in the claims, but includes the reduction of the derivatives of these acids, so far as the invention is applicable.

Tartaric acid is an example of what is known in chemistry as an alcohol acid, an oxidized form in this case of the olefin acid, fumaric acid and of the saturated acid, succinic acid. Higher oxidized forms than alcohol acids are known;—ketone acids, aldehyde acids, etc. Since the present invention is a process of reduction of oxidized forms under suitable conditions of temperature and solution, it applies in general to these oxidized forms whether they are alcohol acids, ketone acids or other oxidized forms of olefin acids or saturated acids.

I do not limit myself to the exact proportions given above, as they may vary somewhat without departing from the spirit of my invention. I am aware that phosphorus and iodin have been used as reducing agents in plain water solution, but

What I claim and desire to secure by Letters Patent, is:—

1. The process of reducing alcoholic and ketonic acids to substances containing a smaller number of atoms of oxygen by reacting on the initial material with hydriodic acid in the presence of a substantially anhydrous organic solvent.

2. The process of reducing alcoholic and ketonic acids to substances containing a smaller number of atoms of oxygen by reacting on the initial material with hydriodic acid in the presence of a substantially anhydrous organic solvent, and in the presence of a catalytic agent.

3. The process of reducing alcoholic and ketonic acids to substances containing a smaller number of atoms of oxygen by reacting on the initial material with a mixture of phosphorous and iodin in the presence of a substantially anhydrous organic solvent.

4. The process of reducing alcoholic and ketonic acids to substances containing a smaller number of atoms of oxygen by reacting on the initial material with a mixture of phosphorus and iodin in the presence of a substantially anhydrous organic solvent, and in the presence of a catalytic agent.

5. The process of reducing alcoholic and ketonic acids to substances containing a smaller number of atoms of oxygen by reacting on the initial material with hydriodic acid in the presence of glacial acetic acid.

6. The process of reducing alcoholic and ketonic acids to substances containing a smaller number of atoms of oxygen by reacting on the initial material with hydriodic acid in the presence of glacial acetic acid, and a catalytic agent.

In witness whereof, I have hereunto set my hand on the 29th day of May, 1908.

ISAAC KING PHELPS.

Witnesses:
M. OLIVE WILLIAMS,
SAMUEL H. FISHER.